United States Patent [19]
Belart

[11] 4,366,745
[45] Jan. 4, 1983

[54] HYDRAULIC BOOSTER

[75] Inventor: Juan Belart, Walldorf, Fed. Rep. of Germany

[73] Assignee: ITT Industries, Inc., New York, N.Y.

[21] Appl. No.: 205,131

[22] Filed: Nov. 10, 1980

[30] Foreign Application Priority Data

Dec. 1, 1979 [DE] Fed. Rep. of Germany ....... 2948427

[51] Int. Cl.³ .............................................. F15B 9/10
[52] U.S. Cl. ....................................... 91/372; 91/378
[58] Field of Search ................. 91/373, 372, 371, 370; 91/378, 434

[56] References Cited
U.S. PATENT DOCUMENTS 2,883,971  4/1959  Ayers, Jr. ............................ 91/373
3,747,473  7/1973  Bach et al. .......................... 91/373

Primary Examiner—Paul E. Maslousky
Attorney, Agent, or Firm—John T. O'Halloran; Alfred C. Hill

[57] ABSTRACT

A hydraulic booster comprising a booster piston, an annular piston bearing against the booster piston and a central piston which is movable within limits relative to the annular piston by the brake pedal to control flow of a pressurized fluid. The central piston and the annular piston are coupled together to move as a unit after the force of a spring is overcome. The central piston is subject to the pressure acting on the booster piston. In order to reduce the force reaction on the brake pedal, the central piston is operated by the brake pedal through a pin subjected to the pressurized fluid, the pin extending centrally through the annular piston in a sealed relationship thereto.

29 Claims, 2 Drawing Figures

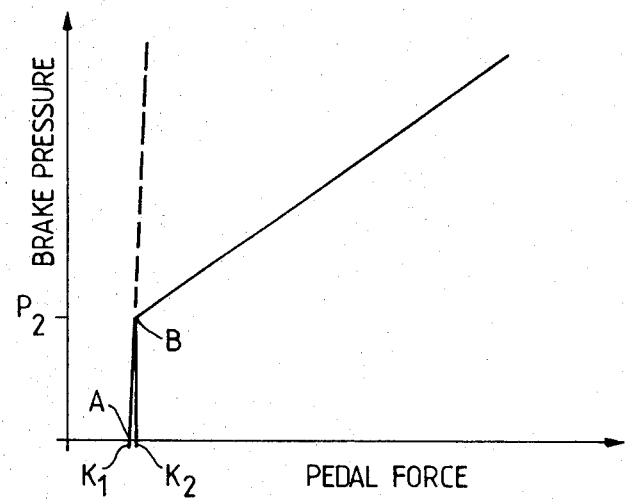

HYDRAULIC BOOSTER

BACKGROUND OF THE INVENTION

This invention relates to a hydraulic booster comprising a booster piston, a pressure-control device, an annular piston bearing against the booster piston, and a central piston, which is movable relative to the annular piston by means of a brake pedal and actuates the pressure-control device, the central piston and the annular piston being adapted to be coupled together after the force of a spring is overcome, whereupon they are movable as one.

Such a booster is disclosed in the copending U.S. application of W. Volkmar and H. Steffes, Ser. No. 67,269, filed Aug. 17, 1979, assigned to the same assignee as the present application.

In the above-cited copending application a hydraulic booster is described which includes a booster piston, a central piston and an annular piston. In this arrangement the annular piston is movable within limits toward the central piston, the central piston acts as a control spool in the booster piston and together with the annular piston as a pressure-control device. The central piston and the brake pedal are directly mechanically interconnected. In such a device, which provides a hydraulic booster having a so-called two-stage action, the pressurized fluid subjected to pressure is led into the pressure chamber, thus, the pressure will inevitably be transmitted via the central piston to the brake pedal. It is, however, the intention to keep the hydraulic reaction on the brake pedal as small as possible, i.e. to attain a two-stage action as rapidly as possible. Due to the construction of the booster of the above-cited copending application, the hydraulic reaction is only limited to some minimum value, which is predetermined by the diameter of the central piston. The diameter of the central piston may only be reduced to a certain size, since it has to accommodate the channels for the pressure control. Therefore, the hydraulic reaction is not as small as possible.

SUMMARY OF THE INVENTION

Therefore, it is an object of the present invention to further develop and to improve a hydraulic booster according to the above-cited copending application in such a manner that the reaction on the brake pedal is as small as possible within the range of the two-stage action, the two-stage action consequently being very great.

A feature of the present invention is the provision of a hydraulic booster comprising a booster piston disposed in a slidably sealed relationship in a housing; an annular piston disposed in the booster piston and acting thereon; a central piston disposed in the booster piston in a cooperating relationship with the annular piston to enable the central piston to move relative to the annular piston when actuated by a brake pedal to control pressurized fluid flow in the booster and to enable the central piston and the annular piston to move as a unit when the force of a first spring disposed between the central piston and the booster piston is overcome; and a pin disposed in the booster piston subjected to the pressurized fluid, the pin being operated upon by the brake pedal and penetrating the annular piston in a sealed relationship to impart the force of the brake pedal to the central piston.

It is ensured with this arrangement that a hydraulic reaction on the brake pedal is due only to the surface of the pin on which pressure acts. Since this pin has to transmit only a minor mechanical force and has no further function, in particular, it has no bores for guidance of the pressurized fluid, its diameter may be very small. The hydraulic reaction on the brake pedal is consequently almost equal to null and the two-stage action is extremely great.

If the central piston is arranged pressure-balanced, the hydraulic reaction may solely be predetermined by the diameter of the pin.

Especially advantageous constructional embodiments are provided in that the housing of the booster accommodates a pressure chamber which is bounded by the booster piston and the annular piston. If the annular piston thereby bears via a resilient member against the booster piston opposite the actuating direction of the piston, the magnitude of the two-stage action can be precisely determined by the construction of the resilient member. When this magnitude is attained, the annular piston—since it is bounding the pressure chamber—will have moved opposite the actuating direction an amount such that it will be in mechanical communication with the tappet of the brake pedal.

A particularly simple form of the housing is provided in that the annular piston is slidably sealed in the booster piston and the booster piston extends out of the housing in a sealed relation.

By having the pin bear against the central piston via a spring, vibrations will be absorbed which may possibly occur upon actuation of the valve (valve flutter). Furthermore, it is ensured that the pin is at all times subjected to the pressure in the hydraulic pressure circuit.

If the spring located between pin and central piston has a higher preload or spring constant than the spring located between central piston and booster piston, the direct close mechanical abutment of the pin on the head of the tappet is guaranteed. Since no further lost travel will occur when actuating the brake pedal, a direct response of the hydraulic booster is ensured.

It is particularly advantageous to have the tappet, which is adapted to be actuated by the brake pedal, centrally fixed in the annular piston such that it is displaceable by a distance relative to the annular piston. Since the pin is centrally penetrating the annular piston, a simultaneous centering of the tappet with respect to the pin may be attained thanks to this arrangement. This is a special advantage because the tappet is provided with a spherical head and the pin offers a relatively small contact surface due to its small diameter.

A favorable fastening of the pin is achieved by having it connected with the central piston. If the pin is subdivided into a head and shank, it may be coaxially connected with the central piston by means of a bayonet-like device. To achieve this, a chamber is provided in the central piston, which is bounded by the front side of the central piston situated in the inner chamber, and the head of the pin is aligned radially with the central piston so as to grip at least partly behind the front side.

In an advantageous embodiment of a bayonet-like device the front side of the central piston has a central bore, whose diameter corresponds to the diameter of the shank of the pin, with the bore being connected via a slot, which has at least the diameter of the bore, with an opening in the front side, this opening being adapted for the head of the pin to fit through. If the diameter of the central piston is a very small one, it is advantageous to locate the opening on the circumference of the central piston.

To guarantee a safe abutment, the pin is kept in abutment with the front side of the central piston by means of a spring arranged in the chamber and acting between central piston and pin.

BRIEF DESCRIPTION OF THE DRAWING

Above-mentioned and other features and objects of this invention will become more apparent by reference to the following description taken in conjunction with the accompanying drawing, in which:

FIG. 2 is a graph of the brake pressure versus the pedal force in a booster as illustrated in FIG. 1.

DESCRIPTION OF THE PREFERRED EMBODIMENT

Figure 1:
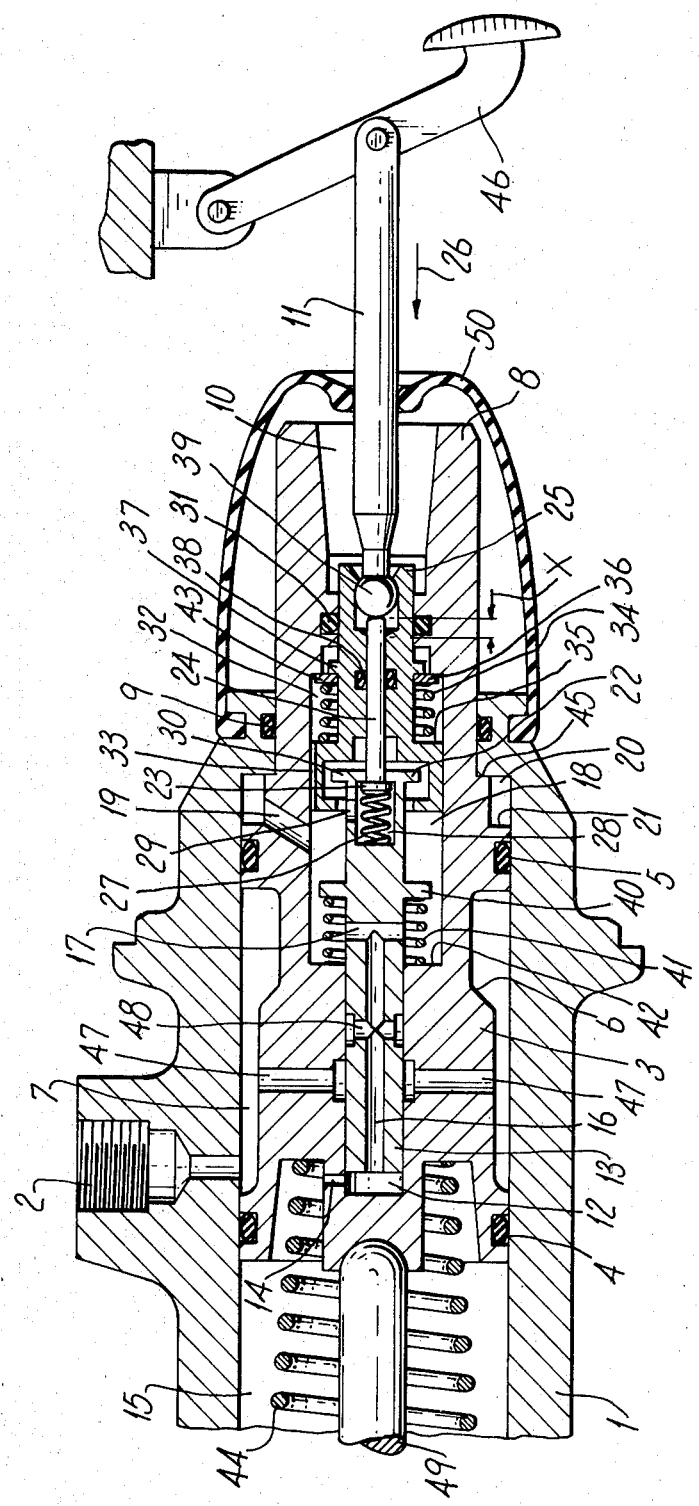
FIG. 1 is a longitudinal cross sectional view of a hydraulic booster in accordance with the principles of the present invention.

Referring to FIG. 1, the booster includes a housing 1 having a fluid port 2 connected with a pressurized fluid accumulator (not shown), port 2 being permanently subjected to pressure. Housing 1 includes therein a booster piston 3 pressure-sealed to and slidable in housing 1 by means of the seals 4 and 5. Between seals 4 and 5 booster piston 3 has a radial groove 6 which creates an inlet chamber 7 between booster piston 3 and housing 1, which is supplied with pressurized fluid via fluid port 2. Booster piston 3 is stepped with its smaller diameter section 8 extending out of housing 1. A seal 9 seals section 8 to housing 1 to seal the inner chamber of housing 1 from the atmosphere. Provided in booster piston 3 is a centrally arranged, stepped bore 10, open in the direction of the tappet 11. Central piston 13 slides in the smaller diameter section 12 of stepped bore 10, with section 12 of bore 10 being connected with a pressureless chamber 15 via a radial passage 14. The pressureless chamber 15 is in direct communication with a reservoir (not shown), from which the pressure accumulator is fed. Via bores 16 and 17 the inner chamber 18 of the larger diameter section of stepped bore 10 is connected with pressureless chamber 15. Via the openings 19 the pressure chamber 20 is also kept pressureless. Pressure chamber 20 is bounded by the step 21 between the large diameter section of booster piston 3 and section 8, by booster piston 3 itself and by housing 1.

The end part 22 of central piston 13, exposed in inner chamber 18, embraces the rim 23 of a pin 24, which centrally penetrates the annular piston 25. Pin 24 is displaceable by tappet 11 relative to central piston 13 in the actuating direction 26 against a spring 27, which is engaged between central piston 13 and pin 24. The chamber 28, which is a result of collar 30 embracing pin rim 23, is directly connected with inner chamber 18 via the opening 29.

Annular piston 25 on its part embraces collar 30 provided at end part 22 of central piston 13 in such a manner that central piston 13 and annular piston 25 are movable relative to each other within limits in the sense of a positive engagement clutch. Annular piston 25, which bounds inner chamber 18 towards tappet 11 and the atmosphere, slides in inner chamber 18, sealed from the pressurized fluid by means of a seal 31 placed in booster piston 3. Annular piston 25 is constructed slightly stepped on its circumference, so that a chamber 32 is formed in booster piston 3 between seal 31 and step 35 of annular piston 25. Chamber 32 is in communication with inner chamber 18 of booster piston 3 via a longitudinal groove 33 in the outer circumference of annular piston 25. Chamber 32 serves for accommodation of a spring bearing to enable annular piston 25 to resiliently bear against booster piston 3. This spring bearing includes a spring 34 abutting step 35 of annular piston 25. Spring 34 keeps a disc 36 in abutment with a projection 43 of booster piston 3. When annular piston 25 is moving opposite to actuating direction 26, spring 34 is compressed. Spring 34 is relieved when annular piston 25 moves in actuating direction 26, after disc 36 abuts projection 37 of annular piston 25.

Further, annular piston 25 has a seal 38, which seals annular piston 25 to pin 24.

On the end of annular piston 25 remote from inner chamber 18, the spherical head 39 of tappet 11 is fixed in annular piston 25. The fastening of head 39 in annular piston 25 is such that the end of head 39 adjacent pin 24 is at a distance x from where it abuts annular piston 25. In all operating positions pin 24 is mechanically abutting head 39 of tappet 11.

Central piston 13 has in inner chamber 18 about its circumference a collar 40, which abuts a spring 41 bearing against the step 42 in booster piston 3. Springs 27 and 41 may be constructed and dimensioned such that central piston 13 will abut annular piston 25 in the inactive position, or the adjacent ends of central piston 13 and annular piston 25 will be spaced from each other.

In the inactive position of the device as is shown, the inactive position of booster piston 3 is ensured by return spring 44, which urges the step 45 of booster piston 3 into abutment with housing 1. Ensured by this position is also the position of central piston 13, since return spring 41 of central piston 13 bears against booster piston 3. Since spring 27 has a greater rigidity compared with spring 41, pin 24 will be in the position shown and, in doing so, will keep head 39 of tappet 11 in the righthand position illustrated. The position of tappet 11, which is mechanically connected with annular piston 25, fixes annular piston 25 likewise in its inactive position.

In the inactive position shown, radial bores 47, which penetrate booster piston 3 and connect inner chamber 12 with inlet chamber 7, are closed by central piston 13. The radial bores 48, arranged in central piston 13 and in communication with bore 16 are closed by booster piston 3 in the same way.

To protect the parts arranged in inner chamber 18 of stepped bore 10, a protecting cap 50 is provided, which is situated in a groove of housing 1 and sealingly embraces tappet 11.

The mode of operation of the device shall be explained with reference to the graph of FIG. 2.

Depression of brake pedal 46 causes tappet 11 in annular piston 25 to move relative to annular piston 25 and to displace pin 24 in actuating direction 26. Since spring 27 has a greater rigidity than spring 41, central piston 13 is carried along in actuating direction 26 due to the displacement of pin 24. Due to this, central piston 13 will close opening 14 and separate inner chamber 18 from pressureless chamber 15. At the same time bore 48 will come to lie under bore 47, so that pressurized fluid will flow from inlet chamber 7 through bores 47 and 48 and bores 16 and 17 into inner chamber 18. Via opening 19 the rising pressure will be transmitted into pressure chamber 20. The now prevailing pressure acts on booster piston 3 in the actuating direction 26 and will subject the piston of a master brake cylinder of a brake unit to a force, for example, via the force transmitting member 49. At the same time the hydraulic pressure will act on annular piston 25 and displace annular piston 25 slightly against the force of spring 34 opposite to actuating direction 26, until the pressure forces, which are acting on the effective surface in inner chamber 18, are in balance with the force of spring 34. Being pressure-balanced, central piston 13 itself will not transmit any forces to its surroundings. Only pin 24 will transmit the pressure forces acting on it to head 39 of tappet 11 and, thus, on to brake pedal 46. The driver will consequently achieve a comparatively high brake pressure when using only low pedal force. This is particularly advantageous in heavy vehicles equipped with an automatic gearbox, where a relatively high pressure force has to be applied even with the vehicle at a standstill.

The brake pressure produced can be seen in the graph of FIG. 2 by the controlled delivery of the pedal force. The input pedal force, identified as K1, at which there does not yet exist any brake pressure, is basically determined by spring 41. According to the type of vehicle, the necessary input pedal force could be predetermined by installing a spring 41 having the desired force. The slope from A to B in the graph of FIG. 2 is in the main determined by the hydraulic force, which counteracts the driver's foot force when the hydraulic booster is actuated. As shown, the slope from point A to point B is relatively steep, since the effect of the hydraulic forces on the brake pedal is relatively small due to the diameter of pin 24. In this case, too, a special slope from point A to point B, desirable for a specific type of vehicle, could be attained by structural modifications, for example, by choosing various diameters of pin 24. At point B the hydraulic booster is balanced out to such an extent that head 39 of tappet 11 abuts the interior of annular piston 25, thus, using up the predetermined free motion x. For the force to continue to rise at outlet member 49 of the hydraulic booster, however, the entire piston 25 has to now be displaced against the hydraulic force in inner chamber 18. This results in considerably higher pedal forces, as seen in the graph of FIG. 2.

In addition, this arrangement ensures that upon failure of the hydraulic booster, a mechanical actuation of the brake unit is possible. After the free motion x is overcome, annular piston 25 together with tappet 11 will be immediately urged into abutment with central piston 13, which on its part may be urged into mechanical abutment with booster piston 3. Thus, a mechanical interconnection of force transmitting member 49 and brake pedal 46 is guaranteed.

As soon as no more hydraulic force is applied on force transmitting member 49, the pistons will return to their inactive position by means of the springs and, in doing so, will connect inner chamber 18 as well as pressure chamber 20 with pressureless chamber 15 again.

While I have described above the principles of my invention in connection with specific apparatus, it is to be clearly understood that this description is made only by way of example and not as a limitation to the scope of my invention as set forth in the objects thereof and in the accompanying claims.

I claim:
1. A hydraulic booster comprising
a booster piston disposed in a slidably sealed relationship in a housing;
an annular piston disposed in said booster piston and acting thereon;
a central piston disposed in said booster piston in a cooperating relationship with said annular piston to enable said central piston to move relative to said annular piston when actuated by a brake pedal to control pressurized fluid flow in said booster and to enable said central piston and said annular piston to move as a unit when the force of a first spring disposed between said central piston and said booster piston is overcome;
a pin disposed in said booster piston subjected to said pressurized fluid, said pin being operated upon by said brake pedal and penetrating said annular piston in a sealed relationship to impart the force of said brake pedal to said central piston;
said booster piston accommodating a first chamber bounded by said booster piston and said annular piston;
said annular piston bearing against said booster piston in a direction opposite to a brake actuating direction via a resilient means; and
said pin bearing against said central piston via a second spring having a higher preload than said first spring.

2. A booster according to claim 1, wherein
said central piston is disposed in said booster piston in a pressure-balanced manner.

3. A booster according to claim 1, wherein
said annular piston is slidably sealed in said booster piston, and
said booster piston extends out of said housing in a slidably sealed relationship therewith adjacent said brake pedal.

4. A booster according to claim 1, further including
a tappet to actuate said annular piston, said tappet having one end connected to said brake pedal and the other end fastened axially to said annular piston to enable said tappet to move a given distance relative to said annular piston, said other end of said tappet abutting the adjacent end of said pin.

5. A booster according to claim 4, wherein
the other end of said pin is formed to be retained in said central piston.

6. A booster according to claim 5, wherein
said pin is coaxially retained in said central piston by means of a bayonet-like device.

7. A booster according to claim 5, wherein
said pin includes a head and a shank, and
said central piston includes therein a second chamber bounded by an end of said central piston disposed in said first chamber and said head is disposed axially in said second chamber to grip the surface of said end of said central piston in said second chamber.

8. A booster according to claim 7, wherein
said end of said central piston has a central bore therein corresponding to the diameter of said shank through which said shank extends into said second chamber.

9. A booster according to claim 8, wherein
said second spring is disposed in said second chamber acting between said central piston and said head to urge said head into abutment with said surface of said end of said central piston.

10. A booster according to claim 1, wherein
the end of said pin remote from said brake pedal is formed to be retained in said central piston.

11. A booster according to claim 10, wherein
said pin is coaxially retained in said central piston by means of a bayonet-like device.

12. A booster according to claim 10, wherein
said pin includes a head and a shank, and
said central piston includes therein a chamber bounded by an end of said central piston adjacent said brake pedal and said head is disposed axially in said chamber to grip the surface of said end of said central piston in said chamber.

13. A booster according to claim 12, wherein
said end of said central piston has a central bore therein corresponding to the diameter of said shank through which said shank extends into said chamber.

14. A booster according to claim 13, wherein
said second spring is disposed in said chamber acting between said central piston and said head to urge said head into abutment with said surface of said end of said central piston.

15. A hydraulic booster comprising:
a booster piston disposed in a slidably sealed relationship in a housing;
an annular piston disposed in said booster piston and acting thereon;
a central piston disposed in said booster piston in a cooperating relationship with said piston to enable said central piston to move relative to said annular piston when actuated by a brake pedal to control pressurized fluid flow in said booster and to enable said central piston and said annular piston to move as a unit when the force of a first spring disposed between said central piston and said booster piston is overcome; and
a pin disposed in said booster piston subjected to said pressurized fluid, said pin being operated upon by said brake pedal and penetrating said annular piston in a sealed relationship to impart the force of said brake pedal to said central piston;
said pin bearing against said central piston via a second spring having a higher preload than said first spring.

16. A booster according to claim 15, further including
a tappet to actuate said annular piston, said tappet having one end connected to said brake pedal and the other end fastened axially to said annular piston to enable said tappet to move a given distance relative to said annular piston, said other end of said tappet abutting the adjacent end of said pin.

17. A booster according to claim 16, wherein
the other end of said pin is formed to be retained in said central piston.

18. A booster according to claim 17, wherein
said pin is coaxially retained in said central piston by means of a bayonet-like device.

19. A booster according to claim 17, wherein
said pin includes a head and a shank, and
said central piston includes therein a chamber bounded by an end of said central piston adjacent said brake pedal and said head is disposed axially in said chamber to grip the surface of said end of said central piston in said chamber.

20. A booster according to claim 19, wherein
said end of said central piston has a central bore therein corresponding to the diameter of said shank through which said shank extends into said chamber.

21. A booster according to claim 20, wherein
said second spring is disposed in said chamber acting between said central piston and said head to urge said head into abutment with said surface of said end of said central piston.

22. A hydraulic booster comprising:
a booster piston disposed in a slidably sealed relationship in a housing;
an annular piston disposed in said booster and acting thereon;
a central piston disposed in said booster piston in a cooperating relationship with said annular piston to enable said central piston to move relative to said annular piston when actuated by a brake pedal to control pressurized fluid flow in said booster and to enable said central piston and said annular piston to move as a unit when the force of a first spring disposed between said central piston and said booster piston is overcome;
a pin disposed in said booster piston subjected to said pressurized fluid, said pin being operated upon by said brake pedal and penetrating said annular piston in a sealed relationship to impart the force of said brake pedal to said central piston; and
a tappet to actuate said annular piston, said tappet having one end connected to said brake pedal and the other end fastened axially to said annular piston to enable said tappet to move a given distance relative to said annular piston, said other end of said tappet abutting the adjacent end of said pin and the other end of said pin is formed to be retained in said central piston.

23. A booster according to claim 22, wherein
said pin is coaxially retained in said central piston by means of a bayonet-like device.

24. A booster according to claim 22, wherein
said pin includes a head and a shank, and
said central piston includes therein a chamber bounded by an end of said central piston adjacent said brake pedal and said head is disposed axially in said chamber to grip the surface of said end of said central piston in said chamber.

25. A booster according to claim 24, wherein
said end of said central piston has a central bore therein corresponding to the diameter of said shank through which said shank extends into said chamber.

26. A booster according to claim 25, further including
a second spring is disposed in said chamber acting between said central piston and said head to urge said head into abutment with said surface of said end of said central piston.

27. A hydraulic booster comprising:
a booster piston disposed in a slidably sealed relationship in a housing;
an annular piston disposed in said booster and acting thereon;
a central piston disposed in said booster piston in a cooperating relationship with said annular piston to enable said central piston to move relative to said annular piston when actuated by a brake pedal to control pressurized fluid flow in said booster and to enable said central piston and said annular piston to move as a unit when the force of a first spring disposed between said central piston and said booster piston is overcome; and
a pin disposed in said booster piston subjected to said pressurized fluid flow, said pin being operated upon by said brake pedal and penetrating said annular piston in a sealed relationship to impart the force of said brake pedal to said central piston;

said pin including a head and a shank, and said central piston including therein a chamber bounded by an end of said central piston adjacent said brake pedal and said head is disposed axially in said chamber to grip the surface of said end of said central piston in said chamber.

28. A booster according to claim 27, wherein said end of said central piston has a central bore therein corresponding to the diameter of said shank through which said shank extends into said chamber.

29. A booster according to claim 28, further including a second spring is disposed in said chamber acting between said central piston and said head to urge said head into abutment with said surface of said end of said central piston.

* * * * *